July 15, 1958     W. N. HAUSSER     2,843,088
CATTLE CHUTE
Filed July 10, 1956     2 Sheets-Sheet 1
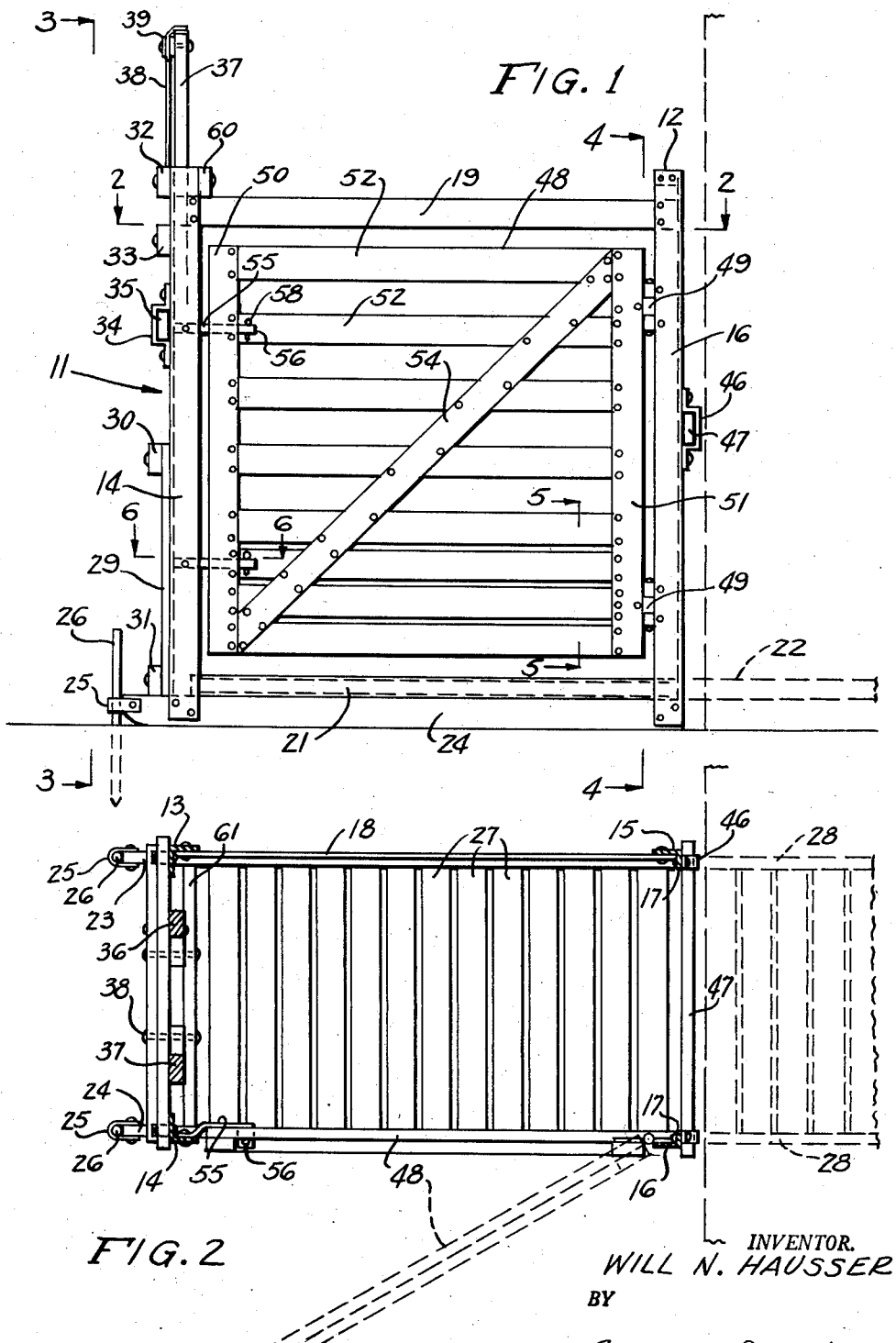
INVENTOR.
WILL N. HAUSSER
BY
McMorrow, Berman + Davidson
ATTORNEYS July 15, 1958 W. N. HAUSSER 2,843,088
CATTLE CHUTE
Filed July 10, 1956 2 Sheets-Sheet 2

INVENTOR.
WILL N. HAUSSER
BY
McMorrow, Berman + Davidson
ATTORNEYS

United States Patent Office 2,843,088
Patented July 15, 1958

2,843,088

CATTLE CHUTE

Will N. Hausser, Sidney, Ill.

Application July 10, 1956, Serial No. 596,904

2 Claims. (Cl. 119—99)

This invention relates to cattle chute devices, and more particularly to a portable cattle chute for holding an animal while an operation is being performed thereon.

A main object of the invention is to provide a novel and improved portable cattle chute which is simple in construction, which is readily adjustable in accordance with the size of the animal to be held therein, and which is relatively light in weight, so that it may be readily moved to a desired location.

A further object of the invention is to provide an improved cattle chute for holding an animal while an operation is performed thereon, said chute being inexpensive to manufacture, being sturdy in construction so that it can be employed to hold a heavy animal, and being easy to manipulate.

Further objects and advantages of the invention will become apparent from the following description and claims, and from the accompanying drawings, wherein:

Figure 1 is a side elevational view of an improved animal holding chute constructed in accordance with the present invention.

Figure 2 is a horizontal cross sectional view taken on the line 2—2 of Figure 1.

Figures 3, 4:
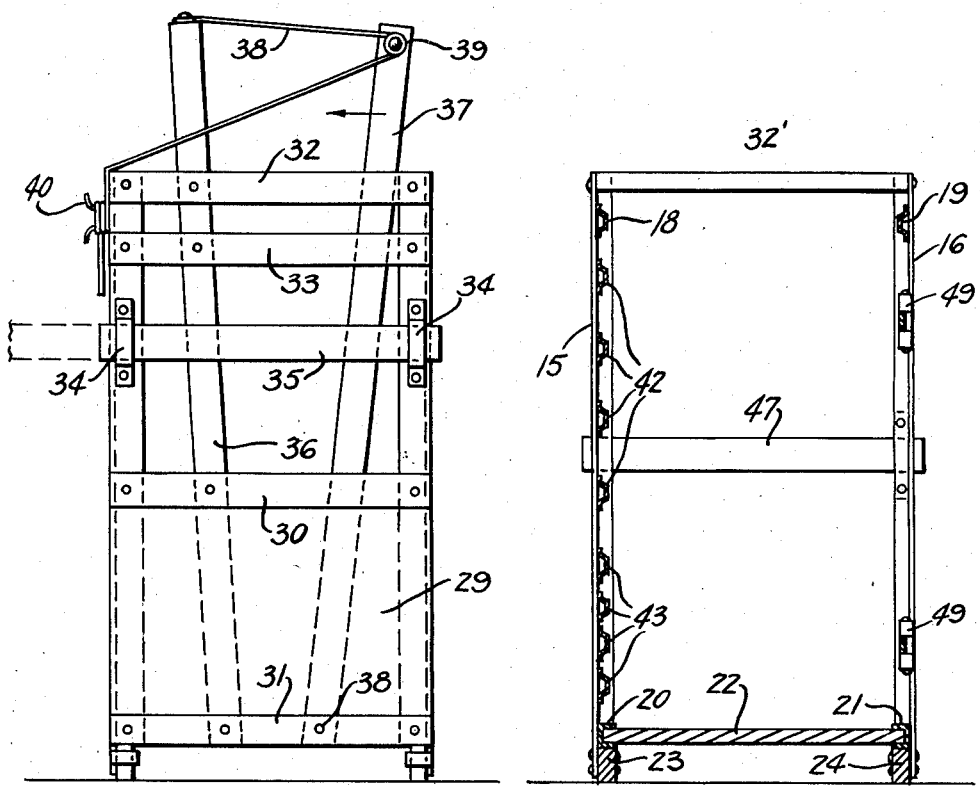
Figure 3 is a front elevational view of the animal holding chute of Figures 1 and 2.
Figure 4 is a vertical cross sectional view taken on the line 4—4 of Figure 1.

Referring to the drawings, the improved cattle chute is designated generally at 11 and comprises an open rectangular frame 12 having vertical sides and vertical corner posts which are connected by horizontal elements to define said frame. Thus, the frame 12 comprises the front vertical corner posts 13 and 14 consisting of angle bars whose flanges are of equal size, and the rear vertical angle bars 15 and 16 whose inwardly directed flanges 17 are of reduced length as compared with the side flanges of said angle bars. The side flanges of the corner bars are connected at their top portions by horizontally extending bar members 18 and 19 and are connected at their lower portions by horizontally extending channel bars 20 and 21 arranged so as to face inwardly, as shown in Figure 4. The channel bars 20 and 21 slidably receive a floor board 22 which may be removed by sliding same rearwardly, as shown in dotted view in Figure 1, in accordance with the size and type of the animal to be placed in the chute.

Secured to the corner posts subjacent to the respective channel bars 20 and 21 are the respective skid members 23 and 24, said skid members projecting forwardly short distances from the forward corner posts 13 and 14, as shown in Figure 2 and having U-shaped loops 25 attached thereto to receive stakes 26 for at times anchoring the chute to the ground.

As shown in Figure 2, the floor board 22 comprises a plurality of transversely extending horizontal boards 27 which are rigidly secured together in any suitable manner for example, to a pair of longitudinally extending marginal rails 28, 28.

Rigidly secured to the lower portions of the forward corner posts 13 and 14 is a rectangular solid panel member 29, said panel member 29 being provided with the top and bottom horizontal cleat members 30 and 31. Secured to the top ends of the corner posts 13 and 14 is a top marginal bar member 32. An additional horizontal bar member 33 is secured to the corner posts 13 and 14 a short distance below the top bar 32. The corner posts 13 and 14 are provided in the space between the top edge of the panel 29 and the bar 33 with a pair of generally U-shaped brackets 34, 34 adapted to receive an auxiliary horizontal bar member 35, the bar member 35 being readily removable when the chute is to be used with a relatively large animal, but being employed when a small animal is to be placed in the chute.

Designated at 36 is a first stanchion member which is rigidly secured to the rear surface of panel member 29 and to the bar members 33 and 32, as is clearly shown in Figure 3, the stanchion member 36 rising a substantial distance above the top bar 32. Designated at 37 is a second stanchion member which is pivoted to the lower marginal portion of the solid panel 29, as by a pivot pin 38, whereby the stanchion 37 is rotatable toward and away from the stanchion 36. A flexible cable 38 is secured at one end to the top end of the stanchion 36 and engages around a pulley or similar guide member 39 provided on the top portion of the stanchion 37, the cable 38 being engageable on an anchoring bracket 40 mounted on the side flange of the vertical corner bar 13 near its top end, as shown in Figure 3, whereby the stanchion 37 may be fastened in clamping engagement with an animal in the chute to hold the animal during an operation.

As will be readily understood, in the case of a large animal, the bar member 35 may be removed to provide sufficient space between the top of the panel 29 and the bar member 33 to receive the neck of the animal. In the case of a small animal, the bar member 35 is employed to define a space sufficiently small to receive the animal's neck, whereby the animal may be clampingly held by rotating the stanchion 37 to clamping contact with the animal's neck and securing the cable 38 to anchor the stanchion 37 in its clamping position.

One side of the frame 12 is provided between the top bar 18 and the bottom bar 20 with a plurality of horizontally extending bar members 42, the upper bar members being relatively widely spaced as compared with the lower bar members, shown at 43, in Figure 4, the bar members comprising, for example, channel elements of suitable metal, such as aluminum, or the like, to provide adequate strength with minimum weight. The other bar members, such as the bar members 18 and 19 are preferably similar channel elements.

The rear corner bars 15 and 16 have mounted on their intermediate portions respective U-shaped bar-receiving brackets 46, said brackets being located to slidably receive the horizontal rear bar 47, said rear bar 47 being readily removable whenever it is desired to allow a free passage through the rear portion of the chute.

Figures 5, 6:
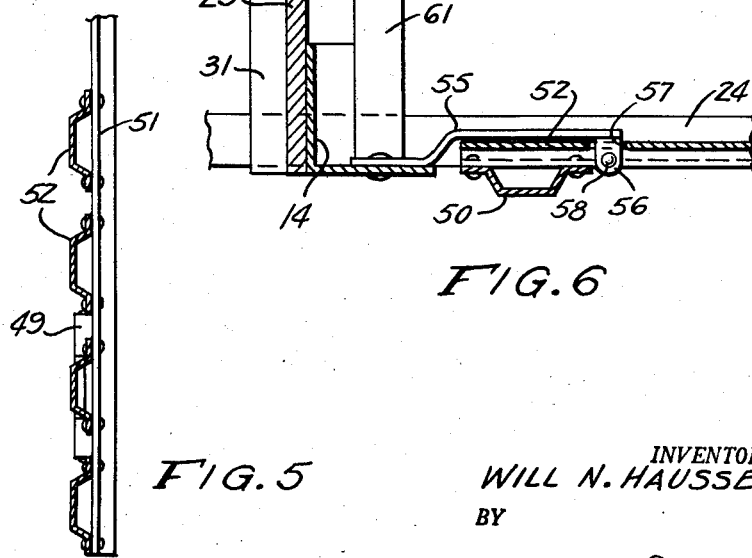
Figure 5 is an enlarged cross sectional detail view taken on the line 5—5 of Figure 1.
Figure 6 is an enlarged horizontal cross sectional detail view taken on the line 6—6 of Figure 1.

Designated at 48 is a gate which is hinged to the rear corner bar 16, for example, by the spaced vertical hinges 49, 49, and which is located in the space between the top side bar 19 and the bottom side bar 21. The gate 48 comprises the vertical marginal bars 50 and 51 connected by the spaced horizontal bars 52, said horizontal bars being preferably of channeled construction, as shown in Figure 5, and being preferably of light strong metal, such as aluminum or the like. The gate 48 is braced by a diagonal bar 54 extending from the lower forward corner to the upper rear corner of the gate, and secured to the intervening horizontal bars 52.

The side flange of the forward corner post 14 has secured thereto a pair of inwardly offset latch bars 55 formed with the apertured end lugs 56 engageable around the vertical bar 50 of the gate when the gate is in its closed position, as shown in Figures 2 and 6. The lugs 56 are located to engage through apertures 57 provided in the width of the horizontal bars 52 of the gate, as shown in Figure 6, the apertured lugs 56 being adapted to receive vertical retaining pins 58 to thereby lock the gate 48 in its closed position. The pins 58 may be readily removed, so that the gate 48 may be swung to an open position, if so desired.

As above explained, the floor 22 may be readily removed by sliding the same rearwardly to disengage the side margins of the floor from the channels 20, 21. This may be necessary when the chute is to be used for relatively large animals. Similarly, the bar 35 may be readily removed, if so desired, to provide clearance for the neck of a larger animal between the fixed stanchion 36 and the rotatable stanchion 37. In the same manner, the rear cross bar 47 may be readily removed, whenever necessary.

As will be readily understood, the gage 48 provides free access to the side of an animal held in the chute by the clamping stanchion 37.

The frame 12 is rigidified at its rear side by a horizontal top cross bar 32' connecting the top ends of the rear corner posts 15 and 16, the frame 12 being of sufficient height to allow an animal to pass freely into the chute beneath the rear cross bar 32' when the intermediate rear cross bar 47 is removed. A further horizontal cross bar 60 is secured to the top ends of the front corner posts 13 and 14 parallel to and spaced inwardly from the cross bar 32, the stanchions 36 and 37 being received between the top cross bars 32 and 60, the fixed stanchion 36 being secured to the cross bar 60 and the movable stanchion 37 being guided for its movement by the parallel top cross bars 32 and 60. A horizontal cross bar 61 is also provided behind the lower marginal portion of the panel 29, connecting the lower portions of the front corner posts 13 and 14. The lower portions of the stanchions 36 and 37 are thus received between the panel 29 and the cross bar 61, the pivot pin 38 for the stanchion 37 extending through the cross bar 61 as well as through bar 31 and panel 29.

While a specific embodiment of an improved cattle holding chute has been disclosed in the foregoing description, it will be understood that various modifications within the spirit of the invention may occur to those skilled in the art. Therefore, it is intended that no limitation be placed on the invention except as defined by the scope of the appended claims.

What is claimed is:

1. A cattle chute comprising a pair of parallel, ground-engaging skid members, an open frame having vertical sides and vertical corner elements mounted on said skid members, opposing inwardly facing, horizontal, channel bars mounted on said skid members, a floor having opposing marginal portions thereof slidably received in said opposing channel bars and being adapted to be removed at times by sliding same longitudinally of the channel bars, one of the vertical sides having a pair of vertically spaced horizontal cross bars mounted thereon, an additional horizontal cross bar removably secured on said one of the vertical sides intermediate said first-named horizontal cross bars, a first upstanding stanchion bar rigidly secured to said first-named horizontal bars, a second upstanding stanchion bar pivotally connected to the lower portion of said one of the sides and extending across said horizontal bars, means for at times securing said second upstanding stanchion bar in clamping engagement against an animal with a portion of the animal engaged between two of said horizontal cross bars, whereby to clamp the animal to the other stanchion bar, a gate hinged to a vertical corner element of the frame, and means for releasably locking the gate adjacent an opposite vertical corner element.

2. A cattle chute comprising a pair of parallel, ground-engaging skid members, an open frame having vertical sides mounted on said skid members, opposing inwardly facing, horizontal, channel bars mounted on said skid members, a floor having opposing marginal portions thereof slidably received in said opposing channel bars and being adapted to be removed at times by sliding same longitudinally of the channel bars, one of said vertical sides having a solid vertical panel element secured on its lower portion and a pair of vertically spaced horizontal bars mounted thereon above said panel element, an additional horizontal cross bar removably secured on said one of the vertical sides intermediate said first-named horizontal cross bars, a first upstanding stanchion bar rigidly secured to said panel element and first named horizontal bars, a second upstanding stanchion bar pivotally connected to said panel element and extending across said horizontal bars, means for at times securing said second upstanding stanchion bar in clamping engagement against an animal with a portion of the animal engaged between two of said horizontal cross bars, whereby to clamp the animal to the other stanchion bar, a gate hinged to a vertical corner element of the frame, and means for releasably locking the gate adjacent an opposite vertical corner element.

References Cited in the file of this patent
UNITED STATES PATENTS

| | | |
|---|---|---|
| 839,252 | Alkire | Dec. 25, 1906 |
| 902,638 | Allison | Nov. 3, 1908 |
| 2,521,487 | Seyler | Sept. 5, 1950 |